3,555,081
PROCESS FOR THE PRODUCTION OF N-CYCLO-
HEXYL SULFAMIC ACID
Joachim Zirner, Leverkusen, and Karl-Gustav Kleb,
Schildgen, Germany, assignors to Farbenfabriken Bayer
Aktiengesellschaft, Leverkusen, Germany, a corporation of Germany
No Drawing. Filed Nov. 14, 1968, Ser. No. 775,910
Claims priority, application Germany, Nov. 21, 1967,
1,643,376, 1,668,044
Int. Cl. C07c 143/20
U.S. Cl. 260—513.6                    14 Claims

ABSTRACT OF THE DISCLOSURE

Process for the preparation of N-monocyclohexyl amidosulfonic acid, i.e. N-cyclohexyl sulfamic acid of the formula $$R{-}NH{-}SO_3H$$

in which R is cyclohexyl, by contacting a cyclohexyl urea of the formula $$R{-}NH{-}\underset{\underset{O}{\|}}{C}{-}NH{-}R'$$

in which R is cyclohexyl and R' is hydrogen or cyclohexyl, substantially in the absence of water and in the presence of an inert organic diluent or solvent at about −20 to 140° C., with (A) at least twice, preferably 2–4 times, the molar quantity of $SO_3$; or
(B) in a first stage with at least the equimolar quantity, preferably 2 times the molar quantity, of $SO_3$ or a compound that gives off $SO_3$ under the reaction conditions, and in a second stage with at least the equimolar quantity, preferably 2 times the molar quantity, of $SO_3$; or
(C) in a first stage with at least the equimolar quantity, preferably 2 times the molar quantity, of $SO_3$ or a compound that gives off $SO_3$ under the reaction conditions, and in a second stage with a quantity of oleum containing at least the equimolar quantity, preferably 2 times the molar quantity, of $SO_3$;

and recovering the resulting precipitate, e.g. by suction filtration, from the reaction mixture.

---

The present invention relates to and has for its objects the provision for a new process for preparing N-monocyclohexyl-amidosulfonic acid, i.e. N-cyclohexyl sulfamic acid, from N-monocyclohexyl urea or N,N'-dicyclohexyl urea and $SO_3$-containing materials in the presence of an inert organic diluent, permitting simple and versatile recovery of the desired product from the reaction mixture.

It is known that, in the reaction of N,N'-dimethyl urea in 30% by weight oleum, N-methylamido sulfonic acid, i.e. N-methyl sulfamic acid, is formed in accordance with the following equation [J. Am. Chem. Soc. 75, 1405 (1953)]:

$$CH_3{-}NH{-}CO{-}NH{-}CH_3 + SO_3 + H_2SO_4 \longrightarrow 2CH_3{-}\underset{H}{N}{-}SO_3H + CO_2$$

Since sulfuric acid has to be used in this reaction, products contaminated with sulfuric acid are obtained, i.e. after working up by pouring the reaction solution into ether.

It is also known that N-cyclohexyl amidosulfonic acid, i.e. N-cyclohexyl sulfamic acid, may be used as a sweetener. In hitherto known manufacturing processes, the acid has to be liberated from its alkali metal or ammonium salts.

It has now been found surprisingly, in accordance with the present invention, that N-cyclohexyl amidosulfonic acid, i.e. N-cyclohexyl sulfamic acid, may readily be obtained by mixing a urea of the formula $$R{-}NH{-}\underset{\underset{O}{\|}}{C}{-}NH{-}R'$$

wherein R represents a cyclohexyl radical and R' represents a cyclohexyl radical or a hydrogen atom, (A) with at least twice the molar quantity of sulfur trioxide; or, alternatively,
(B) in a first stage with at least the equimolar quantity of sulfur trioxide or of a compound that gives off sulfur trioxide, based on the urea used, and, in the second stage, with at least the equimolar quantity of sulfur trioxide based on the urea used; or, alternatively,
(C) in a first stage with at least the equimolar quantity of sulfur trioxide or of a compound that gives off sulfur trioxide, based on the urea used, and, in a second stage, with a quantity of oleum containing at least the equimolar quantity of sulfur trioxide, based on the urea used;

substantially in the absence of water and in the presence of an inert organic diluent at a temperature in the range from −20 to about +140° C.

The N-cyclohexyl amidosulfonic acid i.e. N-cyclohexyl sulfamic acid, compound which is obtained by the process according to the invention corresponds to the formula $$R{-}NH{-}SO_3H$$

in which R is the same as defined above.

The N,N' - dicyclohexyl urea and N-monocyclohexyl urea which may be used as starting materials in the process according to the present invention are known compounds.

Suitable liquid reaction media include inert organic solvents or diluents that are unaffected by, or are stable against, sulfur trioxide, for example halogenated, especially chlorinated and/or fluorinated, aliphatic or aromatic hydrocarbons, and the like, such as methylene chloride, chloroform, carbon tetrachloride, trichloro-fluoro-methane, ethylene chloride, perchloroethylene, and o-dichlorobenzene, i.e. including halogenated, especially chlorinated and/or fluorinated, lower aliphatic and benzene hydrocarbons, and more especially chlorinated and/or fluorinated lower, e.g. $C_{1-4}$ or $C_{1-3}$ or $C_{1-2}$, alkanes and chlorinated benzenes, and the like, as well as aliphatic ethers, including di-lower, e.g. $C_{1-4}$, alkyl ethers such as dimethyl ether, diethyl ether, and the like.

In contrast to conventional processes, in which the alkali metal, alkaline earth metal or ammonium salts, for example the cyclohexylammonium salt, are initially prepared, followed by liberation of the N-cyclohexyl amidosulfonic acid, i.e. N-cyclohexyl sulfamic acid it is possible by means of the process according to the invention directly to obtain N-cyclohexyl amidosulfonic acid i.e. N-cyclohexyl sulfamic acid, without any difficulty.

Advantageously, by virtue of the fact that the process according to the invention is the first of its kind essentially carried out in the presence of an organic diluent or solvent, i.e. essentially in the absence of water and/or sulfonic acid, the free N-cyclohexyl amidosulfonic acid i.e. N-cyclohexyl sulfamic acid is extremely easy to isolate from the organic reaction mixture by filtration, in addition to which the difficult separation of fairly large quantities of sulfuric acid is avoided, i.e. especially with regard to reaction variants A and B above. This one-pot process may also preferably be carried out in a continuous cycle.

For reaction variants A and B

The process according to the invention is carried out as follows: the N-mono- or N,N'-disubstituted urea is either introduced into a solution of sulfur trioxide in a solvent or diluent of the stated type, or alternatively sulfur trioxide, optionally diluted with a solvent or diluent of the stated type, is introduced into a solution or suspension of the N-mono- or N,N'-disubstituted urea in the same or in a different solvent or diluent of such type.

At least 2 mols, normally from 2 to 4 and preferably about 3 mols, of sulfur trioxide are used (i.e. in total for both stages for reaction variant B) per mol of urea. In the first stage of reaction variant B, the first mol of sulfur trioxide may also be replaced by a compound that gives off sulfur trioxide.

In addition to chlorosulfonic acid, the addition products, known from the literature, of sulfur trioxide with for example heterocyclic ethers, including cycloaliphatic ethers, such as 1,4-dioxan tetrahydrofuran and the like, and amides, including N,N-di-lower alkyl lower alkanoic acid amides, such as dimethyl formamide, and the like, are examples of compounds that give off sulfur trioxide, i.e. under the reaction conditions.

For reaction variant C

The process according to the present invention is carried out as follows: the N-mono- or N,N'-disubstituted urea is either introduced in a first stage into a solution of sulfur trioxide, or a compound that gives off sulfur trioxide (as defined above for reaction variant B), in a solvent or diluent of the stated type, or alternatively sulfur trioxide, optionally diluted with a solvent or diluent of the stated type, is introduced into a solution or suspension of the N-mono- or N,N'-disubstituted urea in the same or in a different solvent or diluent of such type, followed by the addition in a second stage of a quantity of oleum containing at least the equimolar quantity of $SO_3$.

Similarly, at least 2 mols, normally from 2 to 4 and preferably about 3 mols, of sulfur trioxide are used (i.e. in total for both stages) per mol of urea. In the first stage of reaction variant C, the first mol of sulfur trioxide may also be replaced by a compound that gives off sulfur trioxide.

In the context of the present invention, oleum is a solution of sulfur trioxide in anhydrous sulfuric acid. Oleum containing substantially between about 60 to 70% by weight of $SO_3$ is preferably used.

It is, in effect, essential that no water or sulfuric acid be present in the reaction mixture in accordance with reaction variants A and B, and in the first stage of reaction variant C. Thus, $SO_3$ or an organic compound yielding $SO_3$, e.g. $HSO_3Cl$ or an addition compound of $SO_3$ with ethers or amides, is used with an organic solvent or diluent to provide anhydrous in situ conditions. In the second stage of reaction variant C, however, the absence of sulfuric acid, i.e., $H_2SO_4$, is not essential, and therefore oleum may be used.

The reaction, in the case of all three variants A, B, and C, is carried out at temperatures of substantially between about $-20$ to $+140°$ C., and preferably at temperatures in a range of from about $+20$ to about $+90°$ C.

For all three reaction variants, the N-cyclohexyl amidosulfonic acid i.e. N-cyclohexyl sulfamic acid, is precipitated during the reaction, accompanied by the evolution of carbon dioxide, sulfur dioxide and, in some instances, hydrogen chloride, and on completion of the reaction is isolated by filtration under suction. Such compound may be used as an artificial sweetener in place of sugar.

The following examples are set forth by way of illustration, and not limitation, of the production process of the present invention:

EXAMPLE 1

(Reaction variant A)

A solution of 24 g. (0.3 mol) of sulfur trioxide in 12 ml. of methylene chloride is added dropwise with thorough cooling at 10° C. to a suspension of 14.2 g. (0.1 mol) of N-monocyclohexyl urea in 70 ml. of methylene chloride. Carbon dioxide and sulfur dioxide are both given off. The reaction mixture is stirred for two hours at 40° C., and then suction filtered at room temperature. Yield 15.2 g. (85% of the theoretical based on N-monocyclohexyl urea) of N-monocyclohexyl amidosulfonic acid, i.e. N-cyclohexyl sulfamic acid, M.P. 178° C.

EXAMPLE 2

(Reaction variant A)

24 g. (0.3 mol) of sulfur trioxide are added dropwise with cooling at 40° C. to a suspension of 22.4 g. (0.1 mol) of N,N'-dicyclohexyl urea in 100 ml. of ethylene chloride. Carbon dioxide and sulfur dioxide are both given off. The reaction mixture is stirred for another 45 minutes at 40 to 50° C. and then suction filtered at 20° C. Yield 25.5 g. (71% of the theoretical based on N,N'-dicyclohexyl urea) of N-monocyclohexyl amidosulfonic acid, i.e. N-cyclohexyl sulfamic acid, M.P. 178° C.

EXAMPLE 3

(Reaction variant A)

Following the procedure described in Example 2, N-monocyclohexyl amidosulfonic acid i.e. N-cyclohexyl sulfamic acid, melting at 178° C. is obtained in a yield of 15 g. (42% of the theoretical based on N,N'-dicyclohexyl urea) using 100 cc. of o-dichlorobenzene as the diluent and stirring the reaction mixture for 90 minutes at 40° C.

EXAMPLE 4

(Reaction variant B)

B—First stage.—11.6 g. (0.1 mol) of chlorosulfonic acid are added dropwise with cooling at 20° C. to a suspension of 22.4 g. (0.1 mol) of N,N'-dicyclohexyl urea in 100 ml. of ethylene chloride. A clear solution is initially formed, followed by the appearance of a white precipitate.

B—Second stage.—16 g. (0.2 mol) of sulfur trioxide are then added dropwise at 50° C., resulting in the precipitation of N-monocyclohexyl amidosulfonic acid, i.e. N-cyclohexyl sulfamic acid, accompanied by the evolution of carbon dioxide, sulfur dioxide and hydrogen chloride. Yield 16.4 g. (45% of the theoretical based on N,N'-dicyclohexyl urea), M.P. 178° C.

EXAMPLE 5

(Reaction variant B)

B—First stage.—A solution of 8 g. (0.1 mol) of sulfur trioxide in 10 ml. of ethylene chloride is added dropwise at 0 to 5° C. to a mixture of 97 g. (0.11 mol) of dioxan and 100 ml. of ethylene chloride. 22.4 g. (0.1 mol) of N,N'-dicyclohexyl urea are introduced into the resulting suspension of the addition compound of sulfur trioxide with dioxan. An almost clear solution is initially formed with slight heating to 20° C., followed by the appearance of a white crystalline deposit.

B—Second stage.—16 g. (0.2 mol) of sulfur trioxide in 20 ml. of ethylene chloride are added dropwise to this deposit. After boiling under reflux for 1 hour, during which both sulfur dioxide and carbon dioxide are given off, the reaction mixture is suction filtered at 10° C.

Yield 21.7 g. (60.5% of the theoretical based in N,N'-dicyclohexyl urea) of N-monocyclohexyl amidosulfonic acid, i.e. N-cyclohexyl sulfamic acid. M.P. 178° C.

EXAMPLE 6

(Reaction variant C)

C—First stage.—8 g. (0.1 mol) of sulfur trioxide are added dropwise at 40° C. to a suspension of 22.4 g. (0.1 mol) of N,N'-dicyclohexyl urea in 100 ml. of methylene chloride.

C—Second stage.—8.6 g. of 65% by weight oleum (i.e. containing 65% $SO_3$ in anhydrous $H_2SO_4$) is then added dropwise at the same temperature to the clear solution which formed upon the completion of the first stage addition. This is followed by boiling under reflux for 1 hour.

N-monocyclohexyl amidosulfonic acid, i.e. N-cyclohexyl sulfamic acid, melting at 178° C., is precipitated in a yield of 21 g. (58.7% of the theoretical based on N,N'-dicyclohexyl urea), accompanied by the evolution of carbon dioxide and sulfur dioxide.

EXAMPLE 7

(Reaction variant C)

N-monocyclohexyl amidosulfonic acid, i.e. N-cyclohexyl sulfamic acid, is similarly obtained in accordance with the procedure of Example 6, by using 0.1 mol of N-monocyclohexyl urea in place of N,N'-dicyclohexyl urea.

It will be appreciated that the instant specification and examples are set forth by way of illustration and not limitation, and that various modifications and changes may be made without departing from the spirit and scope of the present invention.

What is claimed is:

1. Process for the preparation of N-cyclohexyl sulfamic acid which comprises contacting a urea of the formula

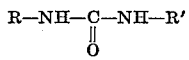

in which R is cyclohexyl and R' is selected from the group consisting of hydrogen and cyclohexyl, substantially in the absence of water and in the presence of an inert organic liquid diluent at a temperature substantially between about −20 to +140° C., with a member selected from the group consisting of
(A) at least twice the molar quantity of sulfur trioxide;
(B) in a first stage with at least the equimolar quantity of a member selected from the group consisting of sulfur trioxide and a compound that gives off sulfur trioxide under the reaction conditions selected from the group consisting of chlorosulfonic acid and the addition products of sulfur trioxide with a member selected from the group consisting of tetrahydrofuran, 1,4-dioxan and N,N-di-lower alkyl lower alkanoic acid amides, and
 in a second stage with at least the equimolar quantity of sulfur trioxide; and
(C) in a first stage with at least the equimolar quantity of a member selected from the group consisting of sulfur trioxide and a compound that gives off sulfur trioxide under the reaction conditions selected from the group consisting of chlorosulfonic acid and the addition products of sulfur trioxide with a member selected from the group consisting of tetrahydrofuran, 1,4-dioxan and N,N-di-lower alkyl lower alkanoic acid amides, and
 in a second stage with a quantity of oleum containing at least the equimolar quantity of sulfur trioxide.

2. Process according to claim 1 wherein the resulting N-cyclohexyl sulfamic acid precipitate is recovered from the reaction mixture by filtration.

3. Process according to claim 1 wherein the process is carried out continuously.

4. Process according to claim 1 wherein said urea is N-monocyclohexyl urea.

5. Process according to claim 1 wherein said urea is N,N'-dicyclohexyl urea.

6. Process according to claim 1 wherein said inert organic diluent is selected from the group consisting of halogenated aliphatic and aromatic hydrocarbons, and aliphatic ethers.

7. Process according to claim 6 wherein said inert organic diluent is selected from the group consisting of methylene chloride, chloroform, carbon tetrachloride, trichloro-fluoro-methane, ethylene chloride, perchloroethylene, o-dichlorobenzene, dimethyl ether and diethyl ether.

8. Process according to claim 1 wherein said oleum contains substantially between about 60–70% by weight $SO_3$.

9. Process according to claim 1 for the preparation of N-cyclohexyl sulfamic acid which comprises contacting a urea of the formula

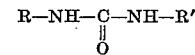

in which R is cyclohexyl and R' is selected from the group consisting of hydrogen and cyclohexyl, substantially in the absence of water and in the presence of an inert organic liquid diluent at a temperature substantially between about −20 to +140° C., with at least twice the molar quantity of sulfur trioxide, based on the urea used, and recovering the resulting N-cyclohexyl sulfamic acid precipitate frof the reaction mixture by filtration.

10. Process according to claim 9 wherein 2–4 mols of sulfur trioxide are used per mol of said urea.

11. Process according to claim 1 for the preparation of N-cyclohexyl sulfamic acid which comprises contacting a urea of the formula

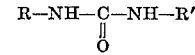

in which R is cyclohexyl and R' is selected from the group consisting of hydrogen and cyclohexyl, substantially in the absence of water and in the presence of an inert organic liquid diluent at a temperature substantially between about −20 to +140° C., in a first stage with at least the equimolar quantity of a member selected from the group consisting of sulfur trioxide and a compound that gives off sulfur trioxide under the reaction conditions selected from the group consisting of chlorosulfonic acid and the addition products of sulfur trioxide with a member selected from the group consisting of tetrahydrofuran, 1,4-dioxan and dimethyl formamide, based on the urea used, and in a second stage with at least the equimolar quantity of sulfur trioxide, based on the urea used, and recovering N-cyclohexyl sulfamic acid precipitate from the reaction mixture by filtration.

12. Process according to claim 11 wherein said compound that gives off sulfur trioxide is used in said first stage, N,N'-dicyclohexyl urea is used as said urea, and a total for both stages of 2–2 mols of sulfur trioxide is used per mol of said urea.

13. Process according to claim 1 for the preparation of N-cyclohexyl sulfamic acid which comprises contacting a urea of the formula

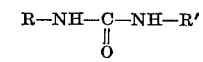

in which R is cyclohexyl and R' is selected from the group consisting of hydrogen and cyclohexyl, substantially in the absence of water and in the presence of an inert organic liquid diluent at a temperature substantially between about −20 to +140° C., in a first stage with at least the equimolar quantity of a member selected from the group consisting of sulfur trioxide and a compound that gives off sulfur trioxide under the reaction conditions selected from the group consisting of chlorosulfonic acid and the addition products of sulfur trioxide with a member selected from the group consisting of tetrahydrofuran, 1,4-dioxan and dimethyl formamide, based on the urea used, and in a second stage with a quantity of oleum containing at least the equimolar quantity of sulfur triovide, based on the urea used, and recovering N-cyclohexyl sulfamic acid precipitate from the reaction mixture by filtration.

14. Process according to claim 13 wherein said compound that gives off sulfur trioxide is used in said first stage, oleum containing substantially between about 60–70% by weight $SO_3$ is used in said second stage, N,N'-dicyclohexyl urea is used as said urea, and a total for both stages of 2–4 mols of sulfur trioxide are used per mol of said urea.

References Cited

FOREIGN PATENTS

| | | | |
|---|---|---|---|
| 589,662 | 6/1947 | Great Britain | 260—513.6 |
| 654,789 | 12/1937 | Germany | 260—513.6 |

OTHER REFERENCES

Patterson, German-English Dictionary for Chemists, second edition (1935), John Wiley & Sons Publishers.

DANIEL D. HOROWITZ, Primary Examiner